Patented Apr. 4, 1939

2,153,525

UNITED STATES PATENT OFFICE 2,153,525

METHOD OF APPLYING COATINGS TO RUBBER, BALATA, AND LIKE ARTICLES, AND ARTICLES PRODUCED THEREBY

Robert J. Snelling, Rochester, Pa., assignor to Impervious Varnish Company, Pittsburgh, Pa., a corporation of Pennsylvania No Drawing. Application June 8, 1936, Serial No. 84,156

1 Claim. (Cl. 91—68)

This invention relates to the art of applying coatings of paint, lacquer, varnish, enamel and like protective or ornamental coatings for rubber, balata and like articles, such as golf balls, hot water bottles, etc.

Heretofore, in the art of painting, varnishing, lacquering, enameling or similarly applying coatings to rubber, balata and like articles, much difficulty has been experienced in obtaining a coating which will adhere to the surfaces of the articles, and not peel, split, check, crack or discolor upon aging and in use of the articles. This, it has been discovered by the present inventor, has been due to the character of the surfaces of the article due to the compounds used, and particularly to the presence of certain substances on the finished articles and changes in the surface substances thereof during aging. Such objectionable surface materials may be produced by oxidation, blooming of sulphur from articles vulcanized by the use of this material, continued vulcanization upon aging, etc., which results in peeling, splitting, checking, cracking or discoloration of the surface coatings.

It has been discovered by the present inventor, however, that this difficulty may be overcome and a coating applied to such articles which will not peel, split, crack, check or discolor due to the character of the surfaces thereof, or upon aging of the articles, or in use, by first treating the articles with an oxidizing agent, preferably in the presence of a halogenizing agent. Such agents carry to completion at the surfaces of the articles the changes which oxidation or further vulcanization produce and change the character of the surfaces of the articles before the coating is applied and probably also microscopically etch the surfaces of the articles to provide a mechanical interlock between the article and its coating. This treatment has been found to produce highly satisfactory results even in articles such as golf balls, which are subjected to severe treatment in use, the coatings applied to balls pretreated as provided herein adhering tenaciously without checking, cracking, discoloring, etc.

To carry out the invention, the articles, after they have been molded or vulcanized to shape, are treated with an oxidizing agent, such as potassium permanganate, hydrogen peroxide, etc., and preferably also a halogenizing agent such as chlorine, bromine, etc., or derivatives thereof.

For example, a highly satisfactory surface pretreating process may be carried out by subjecting the surfaces of the articles to the action of:

| | Parts by weight |
|---|---|
| $KMnO_4$ | 5 |
| $HCl$ | 3 |
| $H_2O$ | 85 |

Golf balls, with balata covers or vulcanized rubber balls, etc., after being shaped or vulcanized, may be immersed in the above solution in a porcelain or glass container for five minutes or so. Thereafter the balls may be removed and rinsed until the rinsing water ceases to be discolored, whereupon the balls may be bleached white by being tumbled in a saturated solution of oxalic acid. The balls are then washed thoroughly in clean water, removed to drying trays and dried at room temperature. Lower priced balls may be sprayed two full coats (approximately twenty minutes between coats) with a mix comprising fifty percent (50%) lacquers and fifty percent (50%) reducer or thinner. Better grade balls may be given three coats (approximately twenty minutes between coats) consisting of forty percent (40%) lacquer and sixty percent (60%) thinner.

It has been found that by the improved process the materials at the surfaces of articles of rubber, balata or the like, are so changed as not to interfere with the normal drying of the coatings, which dry quickly without checking or cracking. It will be understood that the foregoing treatment changes the materials of the rubber articles to end-products of ageing but only at the surface thereof and the elasticity, resilience or "life" of the body of the article is substantially unaffected. The terms "oxidizing" or "oxidizing agent" as used herein are not intended to cover other than true oxidization, i. e., such changes as are brought about by treatment with a material which supplies oxygen in a state or condition to attack the surface materials of the rubber articles to produce the desired end-products on the surface of the articles prior to painting.

As an example of other oxidizing agents, hydrogen peroxide (concentrated) may be successfully used. Also sodium bichromate ($Na_2Cr_2O_7$).

Chlorine or bromine solutions may be used as the halogenizing reagent.

The pre-treatment of the articles of balata, rubber or the like in accordance with the present process faciltates drying of the coatings, improves their adhesion, probably both because of chemical bonding and mechanically interlocking, and improves the flexibility and non-cracking qualities of the paint, lacquer, varnish or enamel used.

Modifications of the invention may be resorted to without departing from the spirit thereof or the scope of the appended claim.

What is claimed is:

That method for applying paint, varnish, lacquer, enamel or the like to rubber, balata or the like which comprises pretreating the surfaces of the articles for a comparatively short period with an oxidizing agent comprising potassium permanganate to produce at the surfaces only of the articles products resulting from substantially complete oxidation of the materials at the surfaces of such articles without substantially affecting the physical properties including the life, elasticity or resilience or the body of the article, said surface being etched and non-glossy from action of the oxidizing agent, and thereafter applying the paint, varnish or enamel or the like to the treated surfaces of said articles.

ROBERT J. SNELLING.